March 18, 1924. 1,487,115
J. L. McQUARRIE
INTELLIGENCE SYSTEM
Filed Sept. 15, 1921 2 Sheets-Sheet 1
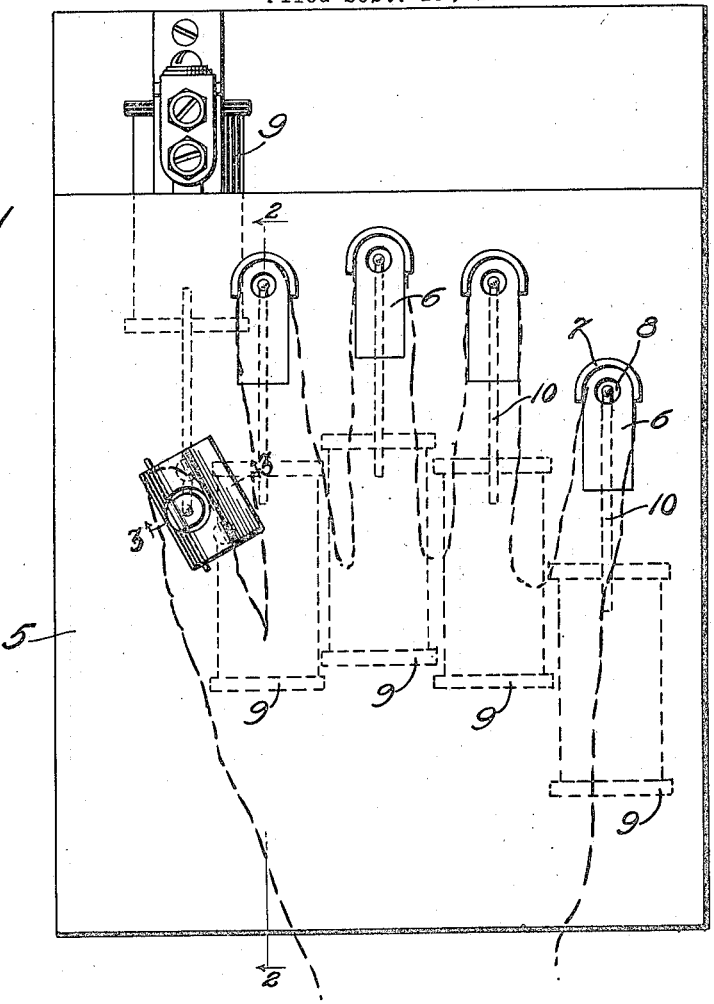
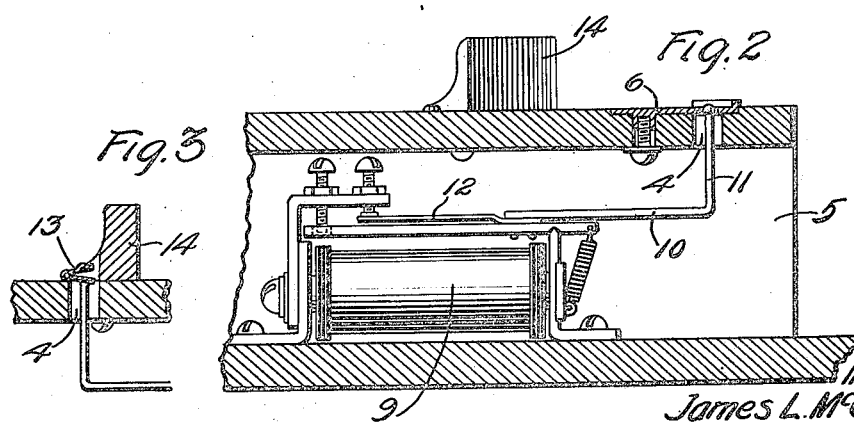
Inventor:
James L. McQuarrie,
by Joel Ch. Palmer Atty.

March 18, 1924.

J. L. McQUARRIE

INTELLIGENCE SYSTEM

Filed Sept. 15, 1921

1,487,115

2 Sheets-Sheet 2

Inventor:
James L. McQuarrie
by Joel C. R. Palmer Atty.

Patented Mar. 18, 1924.

1,487,115

UNITED STATES PATENT OFFICE.

JAMES L. McQUARRIE, OF NEW YORK, N. Y., ASSIGNOR TO WESTERN ELECTRIC COMPANY, INCORPORATED, OF NEW YORK, N. Y., A CORPORATION OF NEW YORK.

INTELLIGENCE SYSTEM.

Application filed September 15, 1921. Serial No. 500,771.

*To all whom it may concern:*

Be it known that I, JAMES L. MCQUARRIE, a citizen of the United States, residing at New York city, in the county of New York, State of New York, have invented certain new and useful Improvements in Intelligence Systems, of which the following is a full, clear, concise, and exact description.

This invention relates to a system for translating electrical effects into mechanical movements, whereby persons who are afflicted by being both blind and deaf may read.

An object of the invention is to provide means to enable a person who is both blind and deaf to read print in a convenient and simple manner and with considerable rapidity.

Another object of the invention is the provision of such a system wherein persons afflicted as above may read print through the sense of touch.

In accordance with the objects of the invention, the sense of touch is utilized for conveying intelligence to a person by means of signals distinctive of a letter or character.

For accomplishing this, a signal receiving device consisting of a series of electromagnetically actuated levers, is arranged so that the free ends of the levers come just beneath the finger tips when the hand is placed on the device through which the levers pass. The levers are selectively controlled through the action of selenium cells or other light sensitive means. If a letter of the alphabet, for instance, is interposed between the selenium cells and a source of light, electrical conditions will be set up in circuits containing the selenium cells whereby electromagnets will be operated to actuate its associated lever to convey to a person who is both blind and deaf, a signal distinctive of a particular character through the sense of touch.

Figure 4:
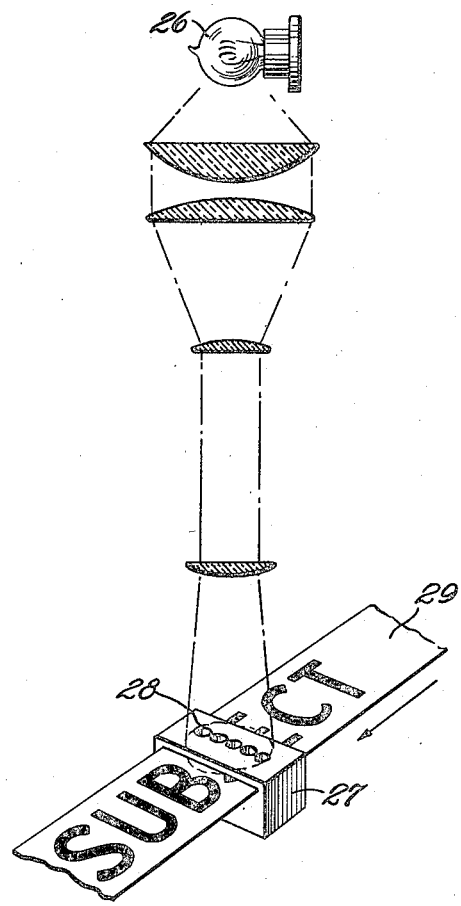

One embodiment of the invention is illustrated in the drawings, in which; Fig. 1 is a plan view of the receiving instrument; Fig. 2 is a sectional view on line 2—2 of Fig. 1; Fig. 3 is a sectional view on line 3—3 of Fig. 1; Fig. 4 is a view showing the manner of applying light rays to a letter of the alphabet, and Fig. 5 is a diagrammatic representation of the circuit arrangement.

As shown in Fig. 1, the receiving device comprises a container or box-like member 5, in the top of which apertures 4 are arranged to conform with the ends of the fingers when the hand is placed on the top of the receiving device. Metallic plates 6 having apertures 8 and flange portions 7 are fastened to the top plate of the receiving device and arranged so that the apertures 8 register with the apertures 4. The flanges 7 afford means for keeping the fingers of the hand in the proper position with respect to these apertures. For the thumb, there is provided a plate 14 arranged in a vertical position to the right of the aperture 4 since ordinarily the right hand of the operator is used. The thumb thus bearing against this plate is held in proper position. A plurality of electromagnets 9 are arranged beneath the top plate of the receiving device and when energized these magnets actuate or vibrate the levers 10 secured to their armatures. The levers 10 have a vertical portion 11 which extends through the apertures 4 and 8 and when the magnets 9 are deenergized, the free end of the vertical portion 11 is substantially flush with the top of the receiving device. Attached to each armature of the electromagnets, is a contact making member 12 which is adapted under certain conditions to act as an interrupter for the magnet 9. In the case of the aperture 4 beneath the thumb of the hand, a special contact making device is provided, consisting of a pivoted bell crank member 13 against one arm of which the free end of the vertical portion 11 contacts and against the other arm of which the thumb is in engagement. This pivoted member 13 is provided so that the thrust of the vertical portion 11 shall be changed in direction so that its effects will be felt by the center portion of the thumb which is the most sensitive.

In the operation of this device, the hand of the operator is placed on the top plate of the receiver and the fingers and the thumb properly positioned in the respective rests. As the magnets 9 are selectively energized, as will be more clearly hereinafter described, the levers 10 are caused to move in a manner so as to cause an impression on the finger under which the projection 11 is positioned.

Figure 5:
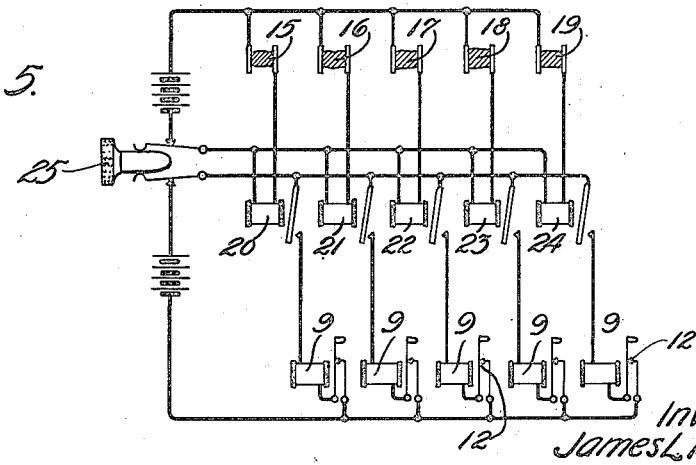

Referring to Fig. 5 which represents the circuit arrangement particularly adapted for enabling persons who are both blind and deaf to read print with considerable rapidity, there is shown a series of selenium cells or other light sensitive devices 15, 16, 17, 18 and 19. In circuit with the selenium cells are a plurality of relays 20, 21, 22, 23 and 24 operated in accordance with the energization of the respective selenium cells. These relays control through their contacts the energization of the magnets 9. It may be assumed that the selenium cells 15, 16, 17, 18 and 19 are normally in the light and that the letters or characters are black with a white back-ground. With the key 25 operated to close its contacts and the application of light rays to the selenium cells through the apertures 28 of the block 27, current is permitted to flow in the circuits in which the relays 20, 21, 22, 23 and 24 are connected, thereby rendering the magnets 9 inoperative.

In order to properly focus the light rays emitted from the source 26 on but one letter at a time, a series of lenses are interposed between the source of light and the block or projecting member 27. The block or projecting member 27 has a series of apertures therein corresponding to the selenium cells 15, 16, 17, 18 and 19.

In the particular case selected for illustrating the invention, the subject matter to be read is formed with black letters on a white background in conformity with the usual practice in printing. It is, however, possible to reverse this and use white letters on a black background with equally good results. No means for advancing the tape from one position to another has been shown but it is, of course, obvious that any suitable means may be provided for accomplishing this feature.

Suppose now, that the tape 29 upon which a series of words or letters are printed, which representation is the word "Subject," is caused to move so that the letter J is brought underneath the apertures 28. Due to the shape of this letter, the intensity of the light reflected to the selenium cell 18 will be the first to be diminished, whereby the current in the winding of relay 23 is likewise diminished so that this relay is deenergized. Upon the deenergization of this relay 23, the energizing circuit of magnet 9 is completed, which, through the instrumentality of contact spring 12 secured to the armature thereof, provides a self-interrupter. Lever 10 will thereupon be caused to vibrate whereby an impression is produced on the third finger of the operator. As the tape 29 proceeds in its advancement, more of the light rays will be cut off and consequently a larger number of the selenium cells will be in darkness. Thus, corresponding relays will be deenergized for permitting the intermittent operation of the magnet 10 associated therewith. An impression, which the operator has learned, which has to do with different positions of the respective letters is thus communicated so that printed matter can be read with considerable rapidity by a person who is both blind and deaf.

Although the invention has been shown in conjunction with a movable tape upon which the subject matter to be read is printed, it is obvious that by the use of additional lenses and reflectors, reading material, such as that found in books and magazines, may also be read equally well. Inasmuch as this does not form a part of the present invention, means for accomplishing this feature has not been shown.

What is claimed is:

1. A device for communicating intelligence to a person who is both blind and deaf comprising a group of electrical circuits, light sensitive means in each of said circuits for producing current impulses, means for rendering said means effective in predetermined combinations in accordance with the desired characters, and translating means individual to said light sensitive means for communicating to such person through the sense of touch, impressions representative of said characters.

2. A device for communicating intelligence to a person who is both blind and deaf comprising a group of electrical circuits, light sensitive means in each of said circuits for providing current impulses, means for rendering said impulses effective in predetermined combinations in accordance with the desired characters, and an electromagnet individual to each of said light sensitive first mentioned means for communicating to such person through the sense of touch, impressions representative of said characters.

3. In combination, a medium upon which letters and characters are printed, a group of electrical circuits, means for projecting said letters and characters on said circuits, means in each circuit for producing current impulses in accordance with the letter or character projected, and additional means individual to said second mentioned means for translating the effects of said current impulses to communicate impulses of the projected letter or character to an operator through the sense of touch.

4. A device for communicating intelligence to a person who is both blind and deaf comprising a group of electrical circuits, light sensitive means in each circuit for producing current impulses, and additional means individual to said light sensitive means for translating the effects of said currents to communicate to such person characteristic impulses representative of different characters in accordance with the operation of said light sensitive means.

5. A device for communicating intelligence to a person who is both blind and deaf comprising a group of electrical circuits, light sensitive devices in each of said circuits for producing current impulses therein upon the application of a source of light, receiving means connected with said devices comprising a plurality of selectively operable electromagnets adapted to translate the effects of such current impulses into impressions to the fingers of a receiving operator corresponding to the operation of the light sensitive devices.

6. A device for communicating intelligence to a person who is both blind and deaf comprising a group of electrical circuits, light sensitive devices in each of said circuits arranged so that when passed by a series of characters of the kind employed in printing or writing they will be effected differently for producing electrical effects characteristic of the particular character, and means responsive to such electrical effects for translating them into motions detectable by the sense of touch.

7. A device for communicating intelligence to a person who is both blind and deaf comprising a group of electrical circuits, selenium cells in each of said circuits arranged so that when passed by a series of characters of the kind employed in printing or writing they will be affected differently for producing electrical effects characteristic of the particular character so positioned, relay means operative by current impulses in such circuits, and electromagnetic means controlled through contacts of said relays for translating the electrical effects thereof into motions detectable by the sense of touch.

8. In combination, a source of light, a tape upon which characters and letters are printed, a projecting member having a plurality of apertures therein for directing light rays emitted by said source of light on different portions of the letter or character positioned thereunder, a group of electrical circuits, electromagnetically operated means, means in each circuit corresponding to said apertures and responsive to a diminution in the intensity of the light rays applied thereto for causing the operation of said electromagnetically operated means to translate the effects of the operation of said means into motions detectable by the sense of touch.

9. In combination, a source of light, a tape upon which characters and letters are printed, a projecting member having a plurality of apertures therein for directing the light rays emitted by said source of light on different portions of the letter or character positioned thereunder, a group of electrical circuits, a plurality of electromagnets, means in each circuit corresponding to said apertures and responsive to a diminution in the intensity of light rays applied thereto, and a relay individual to each of said means and controlled thereby for causing the operation of said electromagnet to translate the effects of the operation of said means into motions detectable by the sense of touch.

In witness whereof, I hereunto subscribe my name this 13th day of September A. D., 1921.

JAMES L. McQUARRIE.